United States Patent
Bordes et al.

(10) Patent No.: US 10,567,761 B2
(45) Date of Patent: Feb. 18, 2020

(54) METHOD AND DEVICE FOR ENCODING AT LEAST ONE IMAGE UNIT, AND METHOD AND DEVICE FOR DECODING A STREAM REPRESENTATIVE OF AT LEAST ONE IMAGE UNIT

(71) Applicant: THOMSON LICENSING, Issy les Moulineaux (FR)

(72) Inventors: Philippe Bordes, Laille (FR); Fabien Racape, Rennes (FR); Tangi Poirier, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 299 days.

(21) Appl. No.: 15/457,989

(22) Filed: Mar. 13, 2017

(65) Prior Publication Data

US 2017/0264900 A1 Sep. 14, 2017

(30) Foreign Application Priority Data

Mar. 14, 2016 (EP) .................................... 16305272

(51) Int. Cl.
*H04N 19/117* (2014.01)
*H04N 19/157* (2014.01)
(Continued)

(52) U.S. Cl.
CPC ......... *H04N 19/117* (2014.11); *H04N 19/157* (2014.11); *H04N 19/176* (2014.11);
(Continued)

(58) Field of Classification Search
CPC ............................ H04N 19/117; H04N 19/176
See application file for complete search history.

(56) References Cited

U.S. PATENT DOCUMENTS 9,148,663 B2 * 9/2015 Lee ...................... H04N 19/159
9,172,961 B2 * 10/2015 Jang ..................... H04N 19/196
(Continued)

FOREIGN PATENT DOCUMENTS

EP 2141927 1/2010
EP 2375747 10/2011
(Continued)

OTHER PUBLICATIONS

NPL Internet Search Log; 2019. (Year: 2019).*
(Continued)

*Primary Examiner* — Luis Perez-Fuentes
(74) *Attorney, Agent, or Firm* — Brian J. Dorini; Xiaoan Lu (57) ABSTRACT

A method for encoding at least one image unit is disclosed. The method includes encoding at least one image unit, reconstructing the at least one image unit into a reconstructed image unit and applying an offset filter to the at least one reconstructed image unit. Applying the offset filter to the at least one reconstructed image unit includes determining at least one current category in a set of categories for at least one pixel of the reconstructed image unit, encoding an offset value for at least one category of the set of categories, applying a pre-filter to the at least one pixel of the reconstructed image unit assigned to the category only in the case where the current category is equal to the category having an encoded offset value and adding the encoded offset value to the at least one pixel of the reconstructed image unit.

12 Claims, 4 Drawing Sheets

(51) Int. Cl.
*H04N 19/82* (2014.01)
*H04N 19/70* (2014.01)
*H04N 19/176* (2014.01)
*H04N 19/17* (2014.01)
*H04N 19/182* (2014.01)

(52) U.S. Cl.
CPC .............. *H04N 19/70* (2014.11); *H04N 19/82* (2014.11); *H04N 19/17* (2014.11); *H04N 19/182* (2014.11)

(56) References Cited

U.S. PATENT DOCUMENTS

| | | | | |
|---|---|---|---|---|
| 9,204,148 | B1* | 12/2015 | Lee | H04N 19/11 |
| 9,204,171 | B1* | 12/2015 | Lee | H04N 19/82 |
| 9,253,482 | B2* | 2/2016 | Kim | H04N 19/80 |
| 9,270,990 | B2* | 2/2016 | Lee | H04N 19/70 |
| 9,854,252 | B2* | 12/2017 | Mody | H04N 19/14 |
| 2012/0294353 | A1* | 11/2012 | Fu | H04N 19/70 375/240.02 |
| 2013/0156097 | A1 | 6/2013 | Budagavi et al. | |
| 2013/0188687 | A1 | 7/2013 | Bjontegaard et al. | |
| 2013/0243104 | A1* | 9/2013 | Chen | H04N 19/51 375/240.29 |
| 2014/0334559 | A1* | 11/2014 | Kim | H04N 19/91 375/240.29 |
| 2014/0376619 | A1* | 12/2014 | Tourapis | H04N 19/117 375/240.03 |
| 2015/0010052 | A1* | 1/2015 | Mody | H04N 19/176 375/240.02 |
| 2015/0043641 | A1* | 2/2015 | Gamei | H04N 19/122 375/240.12 |
| 2015/0049821 | A1* | 2/2015 | Chen | H04N 19/176 375/240.24 |
| 2015/0117528 | A1* | 4/2015 | Kim | H04N 19/82 375/240.12 |
| 2015/0195533 | A1* | 7/2015 | Hsiang | H04N 19/117 375/240.02 |
| 2017/0054976 | A1* | 2/2017 | Li | H04N 19/70 |
| 2017/0264900 | A1* | 9/2017 | Bordes | H04N 19/176 |

FOREIGN PATENT DOCUMENTS

| | | |
|---|---|---|
| EP | 2618576 | 7/2013 |
| EP | 2725797 | 4/2014 |
| KR | 1413154 | 7/2014 |
| TW | 201511523 | 3/2015 |
| WO | WO2014088316 | 6/2014 |

OTHER PUBLICATIONS

Sample adaptive Offset in the HEVC standard; Fu et al; Dec. 2012. (Year: 2012).*
Sample adaptive offset with LCU-independent decoding; Fu; Mar. 2011 (Year: 2011).*
Sullivan et al., "Overview of the High Efficiency Video Coding (HEVC) Standard", IEEE Transactions on Circuits and Systems for Video Technology, vol. 22, No. 12, Dec. 2012, pp. 1649-1668.
Fu et al., "Sample Adaptative Offset in the HEVC Standard", IEEE Transactions on Circuits and Systems for Video Technology, vol. 22, No. 12, Dec. 2012, pp. 1755-1764.
Chien et al., "Adaptative Filter Based on Combiantion of Sum-Modified Lapiacian Filter Indexing and Quadtree Partitioning", ITU—Telecommunications Standardization Sector, Study Group 16, Question 6, Video Coding Experts Group (VCEG), Document VCEG-AL27, 38th Meeting, London, United Kingdom, Jul. 1, 2009, pp. 1-3.
Huang et al., "In-Loop Adaptive Restoration", Joint Collaborative Team on Video Coding (JCT-VC) of ITU-T SG 16 WP 3 and ISO/IEC JTC 1/SC 29/WG 11, Document JCTVC-3077, 2nd Meeting, Geneva, Switzerland, Jul. 21, 2010, pp. 1-11.
Fu et al., "CE13: Sample Adaptive Offset with LCU-Independent Decoding", Joint Collaborative Team on Video Coding (JCT-VC) of ITU-T SG 16 WP 3 and ISO/IEC JTC 1/SC 29/WG 11, Document JCTVC-E040, 5th Meeting, Geneva, Switzerland, Mar. 16, 2011, pp. 1-6.
Fu et al., "CE8 Subtest3: Picture Quadtree Adaptive Offset", Joint Collaborative Team on Video Coding (JCT-VC) of ITU-T SG 16 WP 3 and ISO/IEC JTC 1/SC 29/WG 11, Document JCTVC-D122, 4th Meeting, Daegu, Korea, Jan. 20, 2011, pp. 1-10.
Boyce et al., "Draft high efficiency video coding (HEVC) version 2, combined format range extensions (RExt), scalability (SHVC), and multi-view (MV-HEVC) extensions", Joint Collaborative Team on Video Coding (JCT-VC) of ITU-T SG 16 WP 3 and ISO/IEC JTC 1/SC 29/WG 11, Document JCTVC-R1013_v6, 18th Meeting, Sapporo, Japan, Jun. 30, 2014, pp. 116-118 and pp. 198-200.
Anonymous, "High efficiency video coding", ITU-T Telecommunication Standardization Sector of ITU, H.265, Series H: Audiovisual and Multimedia Systems, Infrastructure of audiovisual services—Coding of moving video, Apr. 2015, pp. 118-120 and pp. 200-202.

* cited by examiner

METHOD AND DEVICE FOR ENCODING AT LEAST ONE IMAGE UNIT, AND METHOD AND DEVICE FOR DECODING A STREAM REPRESENTATIVE OF AT LEAST ONE IMAGE UNIT

1. REFERENCE TO RELATED EUROPEAN APPLICATION

This application claims priority from European No. 16305272.3, entitled "Method and device for encoding at least one image unit, and method and device for decoding a stream representative of at least one image unit," filed on Mar. 14, 2016, the contents of which are hereby incorporated by reference in its entirety.

2. TECHNICAL FIELD

In the following, a method for encoding and a method for decoding an image or a sequence of images, also called video are disclosed. Corresponding encoding and decoding devices are also disclosed.

The encoding and decoding methods according to the present principles may be implemented in a video encoder and/or a video decoder complying with any video codec standardization, including for example HEVC or HEVC extensions like Format Range (RExt), Scalability (SHVC), and Multi-View (MV-HEVC) Extensions.

3. BACKGROUND ART

Traditional video codecs include some in-loop filtering processes for improving the quality of reconstructed images.

One state-of-the-art in-loop filter, complying with HEVC, is the Sample Adaptive Offset (SAO), described in section 8.7.3 of the document ITU-T H.265 entitled "High Efficiency Video Coding". Such offset filter allows adding offsets to some pixels in order to reduce coding artifacts. Two types of filters may be used when SAO is enabled (or activated): Edge Offset (EO) filter or Band Offset (BO) filter. Only one type of SAO filter may be selected for a CTB and the whole CTB is then filtered by either EO filter or BO filter. When the color format include chroma components, the SAO mode is the same for Cb and Cr components. In case of EO or BO, one set of SAO parameters per channel component (e.g. Y,U,V) is encoded, possibly shared with neighboring CTUs (when SAO merge flag is enabled).

Figure 1:
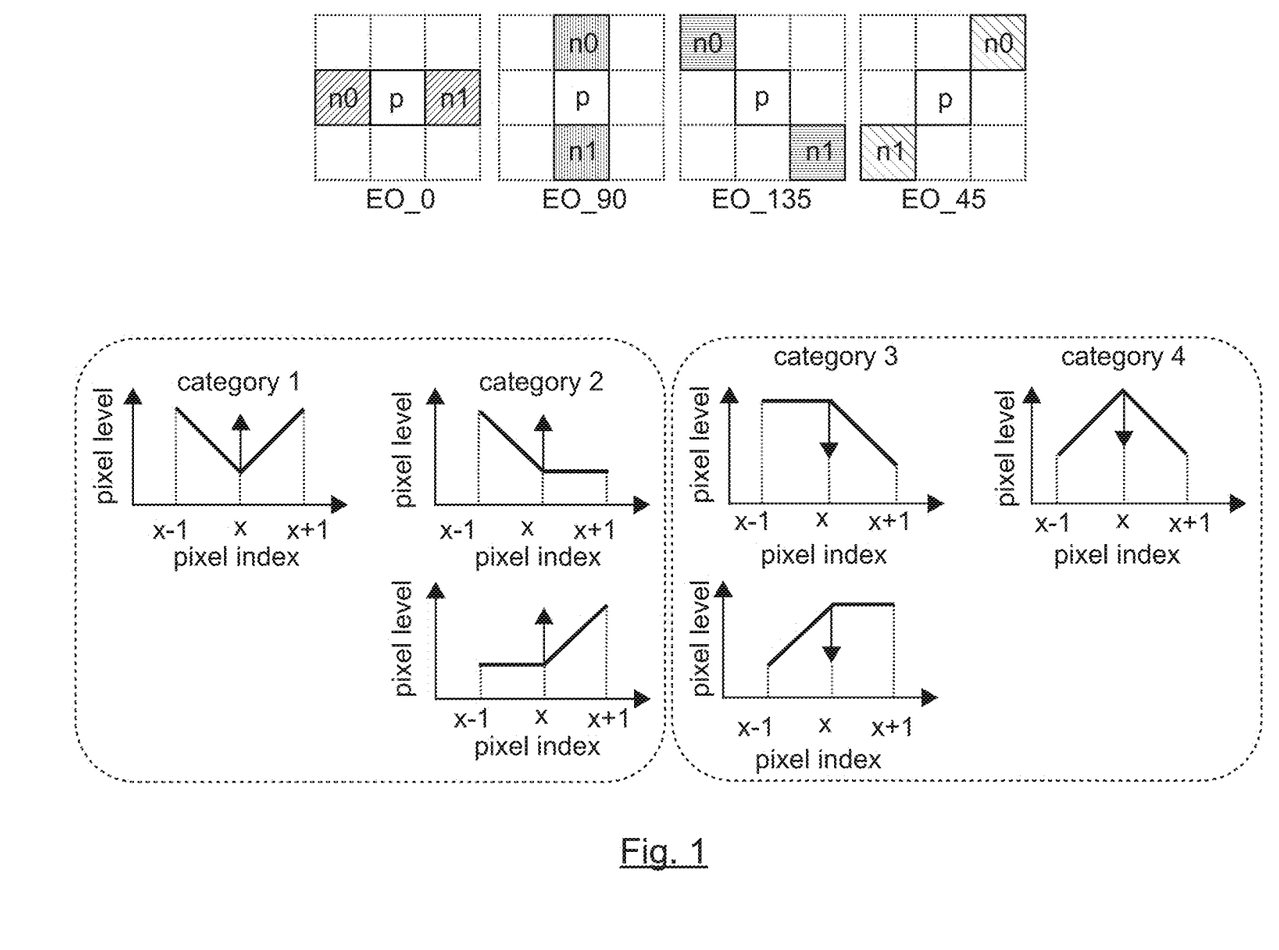
FIG. 1 illustrates the prior art classification of pixels into categories according to HEVC.

As illustrated in FIG. 1, when EO filter is applied, pixels are classified based on edge direction and shape, and corresponding offset value are added to each pixel. First, one of four edge directions is selected for a current pixel and its neighbors (EO—0°, EO—90°, EO—135°, and EO—45°. For the selected direction, a category is assigned to the pixel, depending on the local gradients. Five categories are determined according to HEVC:

category 0—flat area,
category 1—local minimum,
category 2—edge (positive offset),
category 3—edge (negative offset),
category 4—local maximum

| EdgeIx | Condition | Meaning |
|---|---|---|
| 0 | $p = n_0$ and $p = n_1$ | flat area |
| 1 | $p < n_0$ and $p < n_1$ | local minimum |
| 2 | $p < n_0$ and $p = n_1$, or $p < n_1$ and $p = n_0$ | edge |
| 3 | $p > n_0$ and $p = n_1$ or $p > n_1$ and $p = n_0$ | edge |
| 4 | $p > n_0$ and $p > n_1$ | local maximum |

Offsets for each of categories 1-4 are computed after the pixels are classified and encoded in a stream.

Figure 2:
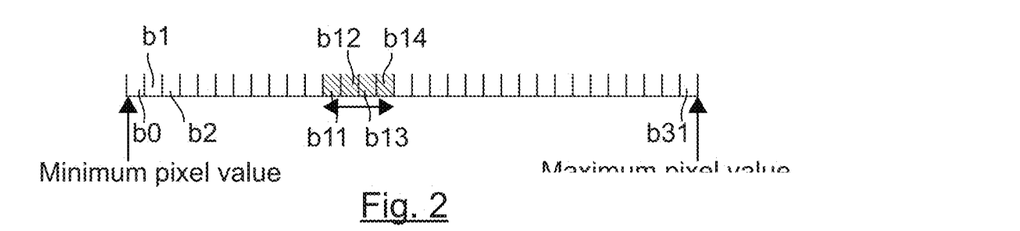
FIG. 2 also illustrates the prior art classification of pixels into categories according to HEVC.

As illustrated in FIG. 2, when BO filter is applied, the pixel value range (0 . . . 255, in 8-bit) is divided into 32 bands (b0, b1, b31) and the pixels belonging to four consecutive bands (b11, b12, b13, b14) starting from a starting band position are modified by adding an offset value (one for each of the consecutive four bands) that is encoded in the stream. It could be considered that the pixels belonging to the four consecutive bands (b11, b12, b13, b14) are assigned to categories 1-4, for which an offset value is computed and encoded, and the pixels belonging to the other bands (b0, b10, b15, b31) are assigned to category 0.

The starting band position and the four offset values are thus encoded in the stream.

As already mentioned, SAO is used to reduce coding artifacts, e.g. ringing artifacts. Ringing artifact is a typical video coding artifact that may appear near sharp edges and that is more visible on nearly uniform (flat) areas. EO aims at reducing ringing artifacts but tends to modify textured areas too, whereas BO does not remove ringing artifacts but corrects the banding artifacts.

It would hence be desirable to provide a technique for encoding and/or decoding an image or a sequence of images aiming at reducing coding artifacts more efficiently.

4. SUMMARY

The present principles relates to a method for encoding at least one image unit, comprising:
  encoding the at least one image unit,
  reconstructing the at least one image unit into at least one reconstructed image unit,
  applying an offset filter to the at least one reconstructed image unit;
  wherein applying an offset filter to the at least one reconstructed image unit comprises:
    determining at least one current category in a set of categories for at least one pixel of the reconstructed image unit,
    encoding an offset value for at least one category of the set of categories;
    applying a pre-filter to the at least one pixel of the reconstructed image unit assigned to the category only in the case where the current category is equal to the category having an encoded offset value;
    adding the encoded offset value to the at least one pixel of the reconstructed image unit.

The present principles thus offer a solution for reducing coding artifacts, by pre-filtering at least one pixel of the reconstructed image unit before adding an encoded offset value to such pixel. According to the present principles, an image unit is an image, a slice, a tile, a CTB ("Coding Tree Block"), a CTU ("Coding Tree Unit"), a CU ("Coding Unit"), a macro block, a block, etc. A pixel is an image point or a sample in the image and is associated with at least one sample value, e.g. a luma sample or a chroma sample.

According to HEVC for example, the offset filter is a sample adaptive offset filter (SAO) and the set of categories comprises categories or bands represented for example by the index EdgeIdx for EO and the index BandIdx for BO.

According to the present principles, a pre-filter is applied to at least one pixel of the reconstructed image unit assigned to a category having an encoded offset value, in order to reduce coding artifacts. Taking account of the pixels of the reconstructed image unit assigned to a category having an encoded offset value aims at preserving the edges in the reconstructed image unit, by removing at least partly the ringing noise. Such category, also called band or class, may depend on the luma/chroma range.

According to at least one embodiment, the method for encoding at least one image unit further comprises encoding a pre-filtering indicator for at least the reconstructed image unit. The pre-filter is then applied to the at least one pixel of the reconstructed image unit assigned to the category only in the case where the current category is equal to the category having a encoded offset value and the pre-filtering indicator indicates the reconstructed image unit should be pre-filtered.

Such pre-filtering indicator, like a flag, may be encoded for a single reconstructed image unit or a group of reconstructed image units. It may be used to indicate which reconstructed image unit(s) should apply pre-filter for the samples with encoded offsets. For example, the pre-filtering may be activated or not for each CTU, or for a subset of samples in the CTU.

In particular, one pre-filtering indicator may be encoded for each channel component (Y, U, V for example) or for all the components.

According to an embodiment, the pre-filter is applied to the at least one pixel of the reconstructed image unit assigned to the category only in the case where the current category is equal to the category having an encoded offset value and the encoded offset value is not equal to zero.

In this way, only the pixels assigned to a category leading to the adding of an offset value which is different from zero are pre-filtered.

For example, the pre-filter belongs to the group comprising:
a median filter,
a linear filter,
a combination of linear filters.

According to a first embodiment, for a pixel of the reconstructed image unit to be pre-filtered, the pre-filter is a median filter taking into account all of the pixels of a filtering window inside the reconstructed image unit assigned to a category having an associated encoded offset value.

According to a second embodiment, for a pixel of the reconstructed image unit to be pre-filtered, the pre-filter is a median filter taking into account the pixels of a filtering window inside the reconstructed image unit assigned to the same category as the pixel to be pre-filtered.

According to a third embodiment, for a pixel of the reconstructed image unit to be pre-filtered, the pre-filter is a median filter taking into account at least one pixel of a filtering window inside the reconstructed image unit assigned to a category having an associated encoded offset value and whose difference with the value of the pixel to be pre-filtered is below a predefined threshold.

For example, the predefined threshold is proportional to a band offset range value.

According to another embodiment, the pre-filter is implemented in a subset of modes of the offset filter or in a single mode of the offset filter. For example, for a SAO filter, the pre-filter may be implemented for edge offset mode, for band offset mode only, or for both modes.

In particular, as band offset mode is classically used to remove banding artifacts, the combination of SAO in BO mode with the pre-filtering according to the present principles aims at both reducing banding artifacts and ringing noise.

A device for encoding at least one image unit is also disclosed that comprises at least one processor, configured to:
encode the at least one image unit;
reconstruct the at least one image unit into at least one reconstructed image unit;
apply an offset filter to the at least one reconstructed image unit;
wherein the at least one processor configured to apply an offset filter to the at least one reconstructed image unit is also configured to:
determine at least one current category in a set of categories for at least one pixel of the reconstructed image unit;
encode an offset value for at least one category of the set of categories;
apply a pre-filter to the at least one pixel of the reconstructed image unit assigned to the category only in the case where the current category is equal to the category having an encoded offset value;
add the encoded offset value to the at least one pixel of the reconstructed image unit.

Such a device, or encoder, may be especially adapted to implement the encoding method described here above. It could of course comprise the different characteristics pertaining to the encoding method according to an embodiment, which may be combined or taken separately. Thus, the characteristics and advantages of the device are the same as those of the encoding method and are not described in more ample detail.

In addition, a method for decoding a stream representative of at least one image unit is disclosed that comprises:
decoding the stream to obtain at least one reconstructed image unit,
applying an offset filter to the at least one reconstructed image unit;
wherein applying an offset filter to the at least one reconstructed image unit comprises:
determining at least one current category in a set of categories for at least one pixel of the reconstructed image unit,
decoding an offset value for at least one category of the set of categories;
applying a pre-filter to the at least one pixel of the reconstructed image unit assigned to the category only in the case where the current category is equal to the category having a decoded offset value;
adding the decoded offset value to the at least one pixel of the reconstructed image unit.

According to an embodiment, a pre-filter is applied to at least one pixel of the reconstructed image unit assigned to a category having an decoded offset value, in order to reduce coding artifacts.

In particular, such method is adapted to the decoding of a stream encoded as described above. The characteristics and advantages of the decoding method are the same as those of the encoding method.

According to at least one embodiment, the method for decoding a stream representative of at least one image unit comprises decoding a pre-filtering indicator for at least the reconstructed image unit. The pre-filter is applied to the at least one pixel of the reconstructed image unit assigned to the category only in the case where the current category is equal to the category having a decoded offset value and the pre-filtering indicator indicates the reconstructed image unit should be pre-filtered.

Such pre-filtering indicator, like a flag, may be decoded for a single reconstructed image unit or a group of reconstructed image units. It may be used to indicate which reconstructed image unit(s) should be pre-filtered.

In particular, one pre-filtering indicator may be decoded for each channel component (Y, U, V for example) or for all the components.

According to an embodiment, the pre-filter is applied to the at least one pixel of the reconstructed image unit assigned to the category only in the case where the current category is equal to the category having a decoded offset value and the decoded offset value is not equal to zero.

In this way, only the pixels assigned to a category leading to the adding of an offset value which is different from zero are pre-filtered.

For example, the pre-filter belongs to the group comprising:
 a median filter,
 a linear filter,
 a combination of linear filters.

According to a first embodiment, for a pixel of the reconstructed image unit to be pre-filtered, the pre-filter is a median filter taking into account all of the pixels of a filtering window inside the reconstructed image unit assigned to a category having an associated decoded offset value.

According to a second embodiment, for a pixel of the reconstructed image unit to be pre-filtered, the pre-filter is a median filter taking into account the pixels of a filtering window inside the reconstructed image unit assigned to the same category as the pixel to be pre-filtered.

According to a third embodiment, for a pixel of the reconstructed image unit to be pre-filtered, the pre-filter is a median filter taking into account at least one pixel of a filtering window inside the reconstructed image unit assigned to a category having an associated decoded offset value and whose difference with the value of the pixel to be pre-filtered is below a predefined threshold.

For example, the predefined threshold is proportional to a band offset range value.

According to another feature, the pre-filter is implemented in a subset of modes of the offset filter or in a single mode of the offset filter.

A device for decoding a stream representative of at least one image unit is also disclosed that comprises at least one processor configured to:
 decode the stream to obtain at least one reconstructed image unit,
 apply an offset filter to the at least one reconstructed image unit;
 wherein the at least one processor configured to apply an offset filter to the at least one reconstructed image unit is also configured to:
  determine at least one current category in a set of categories for at least one pixel of the reconstructed image unit,
  decode an offset value for at least one category of the set of categories;
  apply a pre-filter to the at least one pixel of the reconstructed image unit assigned to the category only in the case where the current category is equal to the category having a decoded offset value;
  add the decoded offset value to the at least one pixel of the reconstructed image unit.

Such a device, or decoder, may be especially adapted to implement the decoding method described here above. It could of course comprise the different characteristics pertaining to the decoding method according to an embodiment, which may be combined or taken separately. Thus, the characteristics and advantages of the device are the same as those of the decoding method and are not described in more ample detail.

A computer program product is disclosed that is downloadable from a communication network and/or recorded on a medium readable by computer and/or executable by a processor comprising software code adapted to perform the encoding method and/or decoding method described above, wherein the software code is adapted to the encoding method and/or decoding method described above.

In addition, a non-transitory computer readable medium is disclosed that comprises a computer program product recorded thereon and capable of being run by a processor, including program code instructions for implementing the encoding method and/or decoding method previously described.

A stream is disclosed that represents at least one encoded image, carrying at least one pre-filtering indicator indicating whether at least one reconstructed image unit obtained from the at least one encoded image should be pre-filtered.

In FIGS. 3-8, the represented blocks are purely functional entities, which do not necessarily correspond to physically separate entities. Namely, they could be developed in the form of software, hardware, or be implemented in one or several integrated circuits, comprising one or more processors.

6. DESCRIPTION OF EMBODIMENTS

It is to be understood that the figures and descriptions have been simplified to illustrate elements that are relevant for a clear understanding, while eliminating, for purposes of clarity, many other elements found in typical encoding and/or decoding devices.

A new technique for reducing coding artifacts is disclosed that relies on the use of offset filters and selective filtering of reconstructed samples. More specifically, it relies on the pre-filtering of at least one pixel of a reconstructed image unit, the pixel to be pre-filtered being assigned to a category having an encoded/decoded offset value, i.e. assigned to a category leading to the adding of an encoded (decoded respectively) offset value (which may possibly be equal to zero). In the following, the word "reconstructed" and "decoded" are used as synonyms.

5.1 Encoding

Figure 3:
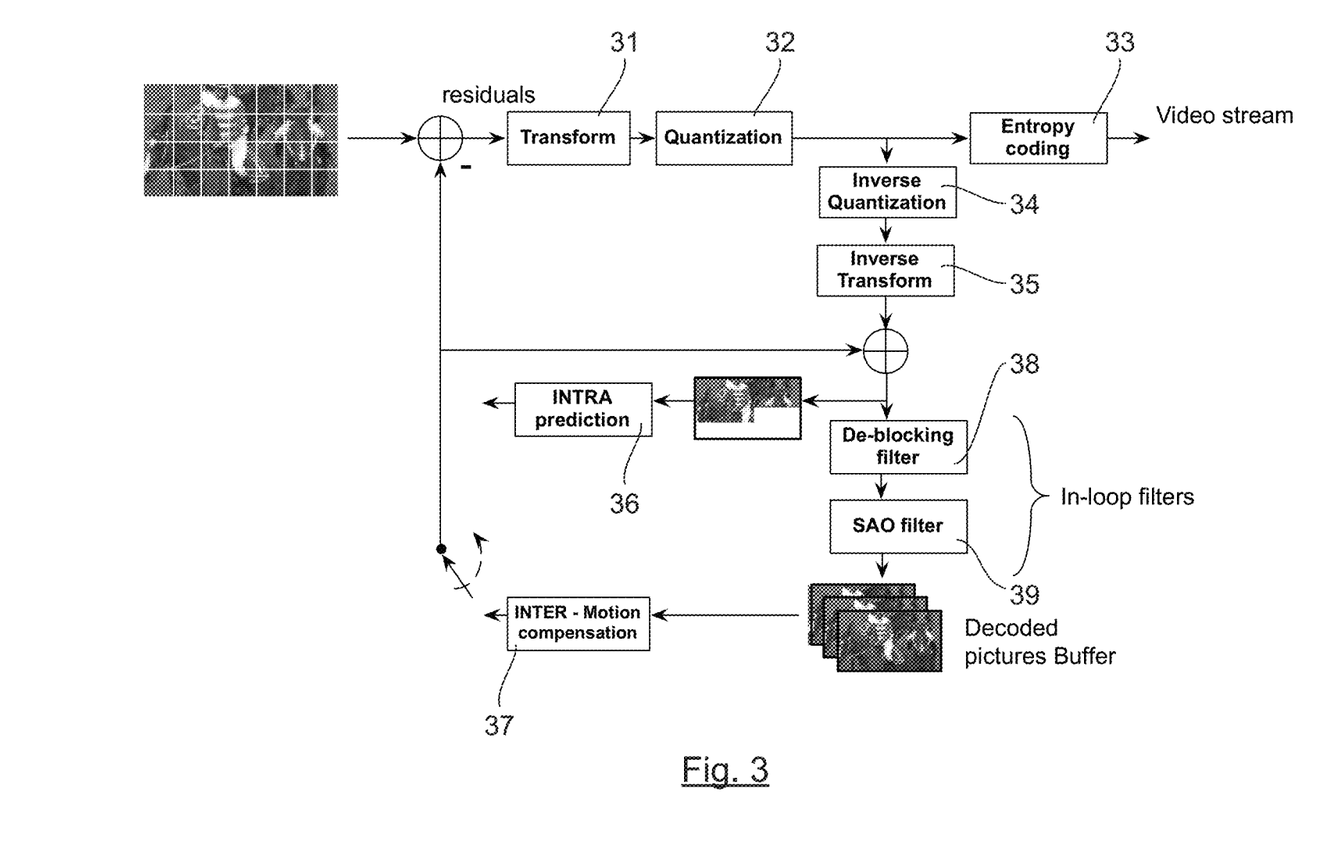
FIG. 3 shows an example of an encoder according to an embodiment.

Let's consider for example an encoder complying with HEVC standard illustrated FIG. 3. It should be noted that the present principles are not limited to HEVC standard and SAO filters, but concerns any coding scheme implementing offset filtering.

As illustrated in FIG. 3, the input signal, comprising at least one image or video, is first split into image units.

The encoder may implement the classical transformation 31, quantization 32, and entropy coding 33 to encode the at least one image unit.

Classically, the encoder implements at least one decoding loop. To this end, the encoder may implement a classical inverse quantization 34, inverse transformation 35, and intra prediction 36 and/or inter prediction 37, to reconstruct the at least one image unit into a reconstructed image unit.

According to HEVC for example, two in-loop filters are inserted into the decoding loop, and applied to the reconstructed image unit(s):
a de-blocking filter 38,
a SAO filter 39.

According to an embodiment, SAO filter 39 is modified, in order to combine the addition of offsets with the selective filtering of some reconstructed samples to reduce coding artifacts. More specifically, SAO filter 39 is modified to apply a pre-filter to some pixels of the reconstructed image unit and then to add an encoded offset value to the pixels of the reconstructed image unit.

Let's now present the main steps of the method for encoding at least one image unit according to a specific embodiment.

Figure 4:
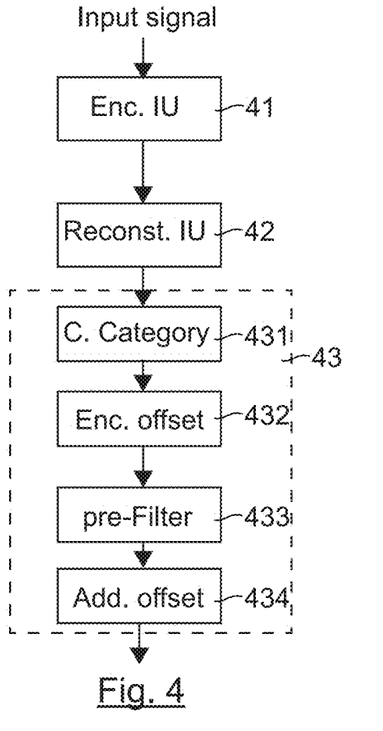
FIG. 4 presents the main steps of the encoding method according to an embodiment.

As illustrated in FIG. 4, at least one image unit is first encoded (41), and reconstructed into a reconstructed image unit (42). Then, an offset filter is applied (43) to the at least one reconstructed image unit.

More specifically, applying an offset filter to the at least one reconstructed image unit comprises:
determining (431) at least one current category in a set of categories for at least one pixel of the reconstructed image unit,
For example, with regards to HEVC standard and FIGS. 1 and 2, the set of categories comprises 5 categories (0-4) for EO, or 32 bands (b0-b31) for BO;
encoding (432) an offset value for at least one category of the set of categories;
For example, with regards to HEVC standard and FIGS. 1 and 2, an offset value is encoded for categories 1-4 for EO, or bands b11-b14 for BO;
applying (433) a pre-filter to the at least one pixel of the reconstructed image unit assigned to the category only in the case where the current category is equal to the category having an encoded offset value;
For example, with regards to HEVC standard and FIGS. 1 and 2, only the pixels assigned to categories 1-4 for EO, or bands b11-b14 for BO, may be pre-filtered;
adding (434) the encoded offset value to the at least one pixel of the reconstructed image unit.

An encoded offset value is thus added only to the pixels that have been pre-filtered.

The encoding method thus allows the offset filtering to be improved by combining it with pre-filtering of the reconstructed image units/samples. The pre-filter is selectively applied on the image units category corrected with offsets.

The pre-filter is for example a median filter, a linear filter, or a combination of linear filters.

According to a first embodiment, for a pixel of the reconstructed image unit to be pre-filtered, the pre-filter is a median filter taking into account all of the pixels of a filtering window inside the reconstructed image unit assigned to a category having an associated encoded offset value.

The pre-filtering of a pixel in the reconstructed image unit thus takes into account the values of all the pixels belonging to a filtering window centered on the pixel to be pre-filtered. In other words, the median filter is processed in a local window of pre-determined size (for example 3×3) around the pixel to be pre-filtered.

For example, in BO, the pre-filter is a median filter computed on all the pixels that belong to the four bands range.

According to a second embodiment, for a pixel of the reconstructed image unit to be pre-filtered, the pre-filter is a median filter taking into account the pixels of a filtering window inside the reconstructed image unit assigned to the same category as the pixel to be pre-filtered.

The pre-filtering of a pixel in the reconstructed image unit thus takes into account the values of some pixels belonging to a filtering window centered on the pixel to be pre-filtered, and assigned to the same category as the pixel to be pre-filtered. In other words, the median filter is processed in a local window of pre-determined size (for example 3×3) around the pixel to be pre-filtered.

For example, in BO, the pre-filter is a median filter computed on all the pixels that belong to the same band as the pixel to be pre-filtered.

According to a third embodiment, for a pixel of the reconstructed image unit to be pre-filtered, the pre-filter is a median filter taking into account at least one pixel of a filtering window inside the reconstructed image unit assigned to a category having an associated encoded offset value and whose difference with the value of the pixel to be pre-filtered is below a predefined threshold.

The pre-filtering of a pixel in the reconstructed image unit thus takes into account the values of some pixels belonging to a filtering window centered on the pixel to be pre-filtered, and assigned to a category having an associated encoded offset value and whose difference with the value of the pixel to be pre-filtered is below a predefined threshold. In other words, the median filter is processed in a local window of pre-determined size (for example 3×3) around the pixel to be pre-filtered.

For example, in BO, the pre-filter is a median filter computed on the pixels that belong to the four bands range and whose difference with the pixel to be pre-filtered is lower than a threshold. According to this example, the value of such a pixel (whose difference with the pixel to be pre-filtered is lower than a threshold) is added to a median list ml[ ] and a median list counter n is incremented. The filtered value is finally computed as ml[n>>1].

For example, the predefined threshold is proportional to the band offset range value. For example, in 8-bit, the threshold is K×8, with K a pre-defined value, equal to 1 for example. The threshold may be fixed, or transmitted to the decoder within the stream.

According to a fourth embodiment, the pre-filter is a linear filter or a combination of two separable linear filters (horizontal and/or vertical).

According to at least one embodiment of the invention, it is proposed to encode at least one pre-filtering indicator, also called flag, to indicate whether the pixels of at least one reconstructed image unit should be pre-filtered before adding offset values. Such pre-filtering indicator is called for example sao_prefilter_flag.

One flag value may be encoded for all the channel components of at least one reconstructed image unit, or one flag value may be encoded per channel component.

For example, for at least one image unit, the encoder may implement a classical SAO filter and a SAO filter with pre-filtering according to the discussed invention. It may then compare the reconstructed image unit obtained with a classical filter and the reconstructed image obtained with a SAO filter with pre-filtering according to the discussed invention, and compute a sum of absolute difference (SAD). If the SAD is above a predefined threshold, it is considered that the pre-filtering improves the reconstructed image unit, and that the pre-filtering indicator sao_prefilter_flag should be activated for the at least one image unit. The encoder may also compute the Peak Signal-to-Noise Ratio (PSNR) of the reconstructed image unit obtained with a SAO filter with pre-filtering according to the discussed invention, to determine whether the pre-filtering indicator sao_prefilter_flag should be activated or not for the at least one image unit.

Such indicator or flag may also be encoded for one offset mode only (for example, BO if we consider HEVC standard). Else, it is inferred to be false. In this way, the pre-filtering may be implemented in a subset of modes of the offset filter or in a single mode of the offset filter.

An example of HEVC syntax for encoding the pre-filtering indicator sao_prefilter_flag is given in Annex 1 for BO mode only, and in Annex 2 for both BO and EO.

According to at least one embodiment of the invention, it is also proposed to encode at least one presence indicator at a higher level (High-Layer Syntax), for instance in the slice header, the Picture Parameters Sets (PPS) or the Sequence Parameter Set (SPS), to indicate whether at least one pre-filtering indicator is present at a reconstructed image unit level. Such presence indicator is called for example sao_prefilter_present_flag.

An example of HEVC syntax for encoding the presence indicator sao_prefilter_present_flag in the SPS is given in Annex 3. An example of HEVC syntax for encoding the SAO parameters where the presence of the syntax element sao_prefilter_flag for at least one reconstructed unit is conditioned to the value of sao_prefilter_present_flag is given in Annex 4.

While not explicitly described, the present embodiments and variants may be employed in any combination or sub-combination.

A stream representative of at least one image unit is thus generated. Such stream carry the encoded offsets values, and may carry at least one of the indicators mentioned above.

5.2 Decoding

Figure 5:
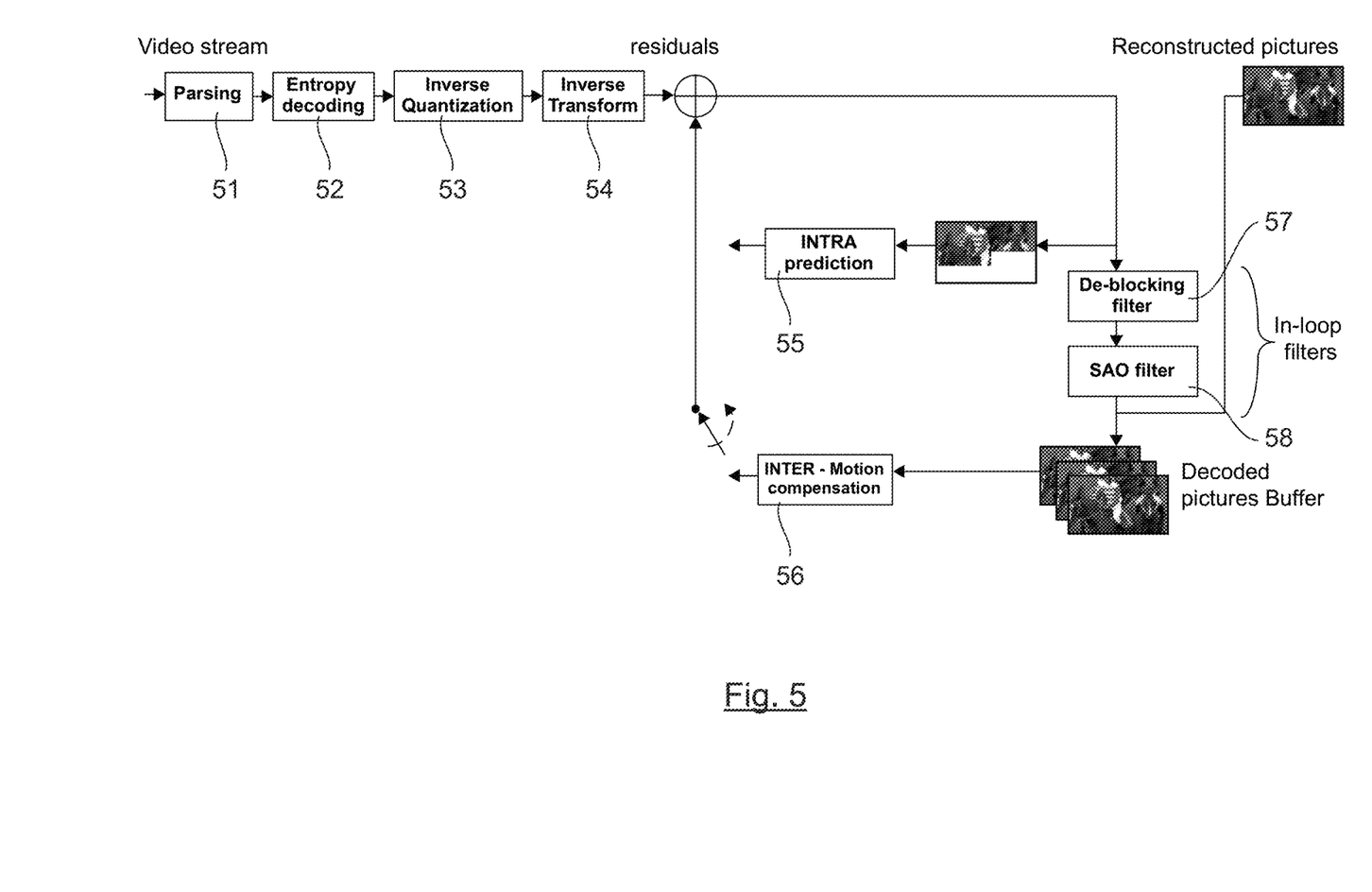
FIG. 5 shows an example of a decoder according to an embodiment.

Let's now consider for example a decoder complying with HEVC standard illustrated FIG. 5. Once again, it should be noted that the present principles are not limited to HEVC standard and SAO filters, but concerns any decoding scheme implementing offset filtering.

As illustrated in FIG. 5, at the decoding side, the stream representative of at least one image unit is parsed (51) and decoded. Such decoder may implement entropy decoding 52, inverse quantization 53, and inverse transformation 54 intra prediction 55 and/or inter prediction 56, to obtain at least one reconstructed image unit.

In order to improve the decoding of the image units, the decoder may also implement in-loop filtering. According to HEVC for example, two in-loop filters are inserted in the decoding loop, and applied to the reconstructed image unit(s):

a de-blocking filter 57,
a SAO filter 58.

According to an embodiment, SAO filter 58 is modified, in order to combine the addition of offsets with the selective filtering of some pixels of a reconstructed image unit, to reduce coding artifacts. More specifically, SAO filter 58 is modified to apply a pre-filter to some pixels of the reconstructed image unit and then to add a decoded offset value to the pixels of the reconstructed image unit.

Let's now present the main steps of the method for decoding a stream representative of at least one image unit according to a specific embodiment.

Figure 6:
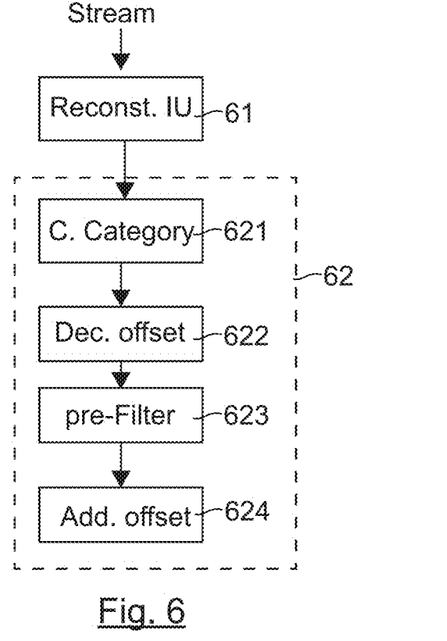
FIG. 6 presents the main steps of the decoding method according to an embodiment.

As illustrated in FIG. 6, the stream is decoded to obtain at least one reconstructed image unit (61). Then, an offset filter is applied (62) to the at least one reconstructed image unit. More specifically, applying an offset filter to the at least one reconstructed image unit comprises:

determining (621) at least one current category in a set of categories for at least one pixel of the reconstructed image unit, decoding (622) an offset value for at least one category of the set of categories;

applying (623) a pre-filter to the at least one pixel of the reconstructed image unit assigned to the category only in the case where the current category is equal to the category having a decoded offset value;

adding (624) the decoded offset value to the at least one pixel of the reconstructed image unit.

A decoded offset value is thus added only to the pixels that have been pre-filtered. The pixels in the other categories (i.e. the pixels in category 0 in EO case, or in the other bands (b0, . . . , b10, b15, . . . , b31) in the BO case) remains unchanged or are added a zero offset value.

The decoding method thus allows the offset filter to be improved by combining it with pre-filtering of the reconstructed image units/samples. The pre-filter is selectively applied on the image units category corrected with offsets decoded from the stream.

The offset filtering implemented at decoding is very similar to the offset filtering implemented at encoding. It is thus not described in more detail.

In particular, the decoded offset values may be obtained by decoding the encoded offset values transmitted in the stream.

According to a specific embodiment, the decoder may detect at least one pre-filtering or presence indicator during the parsing of the stream, indicating respectively whether the pixels of at least one reconstructed image unit should be pre-filtered before adding offset values, and whether at least one pre-filtering indicator is present at the reconstructed image unit level.

5.3 Devices

Figure 7:
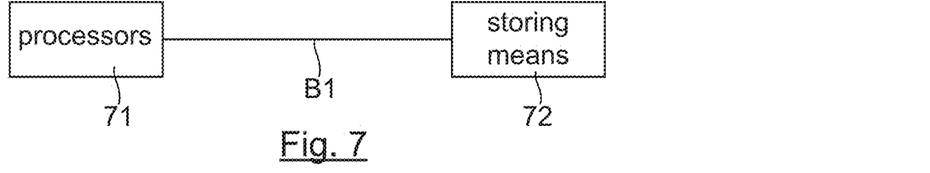
FIG. 7 is a simplified block diagram of a device implementing the encoding method according to FIG. 4.

FIG. 7 illustrates an example of device for encoding at least one image unit according to an embodiment. Only the essential elements of the encoding device are shown.

Such an encoding device comprises at least:

at least one processor (or programmable element) 71 for executing the applications and programs stored in a non-volatile memory of the device and especially configured to:

encode the at least one image unit,
reconstruct the at least one image unit into at least one reconstructed image unit,
apply an offset filter to the at least one reconstructed image unit by:
  determining at least one current category in a set of categories for at least one pixel of the reconstructed image unit,
  encoding an offset value for at least one category of the set of categories;
  applying a pre-filter to the at least one pixel of the reconstructed image unit assigned to the category only in the case where the current category is equal to the category having an encoded offset value;
  adding the encoded offset value to the at least one pixel of the reconstructed image unit.
storing means 72, such as a volatile memory;
an internal bus B1 to connect the various modules and all means well known to the skilled in the art for performing the encoding device functionalities.

Figure 8:
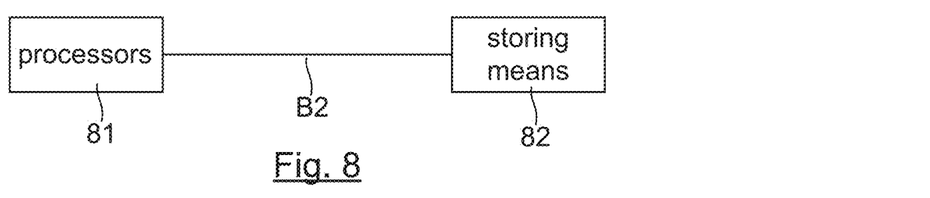
FIG. 8 is a simplified block diagram of a device implementing the decoding method according to FIG. 6.

FIG. 8 illustrates an example of a device for decoding a stream representative of at least one image unit according to an embodiment. Only the essential elements of the decoding device are shown.

Such a decoding device comprises at least:
at least one processor (or programmable element) 81 for executing the applications and programs stored in a non-volatile memory of the device and especially configured to:
decode the stream to obtain at least one reconstructed image unit,
apply an offset filter to the at least one reconstructed image unit, by
  determining at least one current category in a set of categories for at least one pixel of the reconstructed image unit,
  decoding an offset value for at least one category of the set of categories;
  applying a pre-filter to the at least one pixel of the reconstructed image unit assigned to the category only in the case where the current category is equal to the category having a decoded offset value;
  adding the decoded offset value to the at least one pixel of the reconstructed image unit,
storing means 82, such as a volatile memory;
an internal bus B2 to connect the various modules and all means well known to the skilled in the art for performing the decoding device functionalities.

Such encoding device and/or decoding device could each be implemented according to a purely software realization, purely hardware realization (for example in the form of a dedicated component, like in an ASIC, FPGA, VLSI, . . . ), or of several electronics components integrated into a device or in a form of a mix of hardware elements and software elements. It could also be implemented in the form of a system.

The flowchart and/or block diagrams in the Figures illustrate the configuration, operation and functionality of possible implementations of systems, methods and computer program products according to various embodiments. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present principles can be embodied as a system, method, computer program or computer readable medium. Accordingly, aspects of the present principles can take the form of an entirely hardware embodiment, an entirely software embodiment (including firmware, resident software, microcode, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer disc, a hard disc, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

---

ANNEX 1

Descriptor

```
sao( rx, ry ){
  if( rx > 0 ) {
    leftCtbInSliceSeg = CtbAddrInRs > SliceAddrRs
    leftCtbInTile = TileId[ CtbAddrInTs ] = = TileId[ CtbAddrRsToTs[ CtbAddrInRs − 1 ] ]
```

ANNEX 1

| | Descriptor |
|---|---|
| ```
    if( leftCtbInSliceSeg && leftCtbInTile )
       sao_merge_left_flag
  }
  if( ry > 0 && !sao_merge_left_flag ) {
    upCtbInSliceSeg = ( CtbAddrInRs − PicWidthInCtbsY ) >= SliceAddrRs
    upCtbInTile = TileId[ CtbAddrInTs ] = =
                  TileId[ CtbAddrRsToTs[ CtbAddrInRs − PicWidthInCtbsY ] ]
    if( upCtbInSliceSeg && upCtbInTile )
       sao_merge_up_flag
  }
  if( !sao_merge_up_flag && !sao_merge_left_flag ) {
    for( cIdx = 0; cIdx < 3; cIdx++ )
       if( ( slice_sao_luma_flag && cIdx = = 0 ) ||
           ( slice_sao_chroma_flag && cIdx > 0 ) ) {
         if( cIdx = = 0 )
           sao_type_idx_luma
         else if( cIdx = = 1 )
           sao_type_idx_chroma
         if( SaoTypeIdx[ cIdx ][ rx ][ ry ] != 0 ) {
           for( i = 0; i < 4; i++ )
             sao_offset_abs[ cIdx ][ rx ][ ry ][ i ]
           if( SaoTypeIdx[ cIdx ][ rx ][ ry ] = = 1 ) {
             sao_prefilter_flag
             for( i = 0; i < 4; i++ )
               if( sao_offset_abs[ cIdx ][ rx ][ ry ][ i ] != 0 )
                 sao_offset_sign[ cIdx ][ rx ][ ry ][ i ]
             sao_band_position[ cIdx ][ rx ][ ry ]
           } else {
             if( cIdx = = 0 )
               sao_eo_class_luma
             if( cIdx = = 1 )
               sao_eo_class_chroma
           }
         }
  }
}
``` | ae(v)<br><br><br><br><br><br>ae(v)<br><br><br><br><br><br><br>ae(v)<br><br>ae(v)<br><br><br>ae(v)<br><br>ae(v)<br><br><br>ae(v)<br>ae(v)<br><br><br>ae(v)<br><br>ae(v) |

ANNEX 2

| | Descriptor |
|---|---|
| ```
sao( rx, ry ){
  if( rx > 0 ) {
    leftCtbInSliceSeg = CtbAddrInRs > SliceAddrRs
    leftCtbInTile = TileId[ CtbAddrInTs ] = = TileId[ CtbAddrRsToTs[ CtbAddrInRs − 1 ] ]
    if( leftCtbInSliceSeg && leftCtbInTile )
       sao_merge_left_flag
  }
  if( ry > 0 && !sao_merge_left_flag ) {
    upCtbInSliceSeg = ( CtbAddrInRs − PicWidthInCtbsY ) >= SliceAddrRs
    upCtbInTile = TileId[ CtbAddrInTs ] = =
                  TileId[ CtbAddrRsToTs[ CtbAddrInRs − PicWidthInCtbsY ] ]
    if( upCtbInSliceSeg && upCtbInTile )
       sao_merge_up_flag
  }
  if( !sao_merge_up_flag && !sao_merge_left_flag ) {
    for( cIdx = 0; cIdx < 3; cIdx++ )
       if( ( slice_sao_luma_flag && cIdx = = 0 ) ||
           ( slice_sao_chroma_flag && cIdx > 0 ) ) {
         if( cIdx = = 0 )
           sao_type_idx_luma
         else if( cIdx = = 1 )
           sao_type_idx_chroma
         if( SaoTypeIdx[ cIdx ][ rx ][ ry ] != 0 ) {
           sao_prefilter_flag
           for( i = 0; i < 4; i++ )
             sao_offset_abs[ cIdx ][ rx ][ ry ][ i ]
           if( SaoTypeIdx[ cIdx ][ rx ][ ry ] = = 1 ) {
             for( i = 0; i < 4; i++ )
``` | <br><br><br><br><br>ae(v)<br><br><br><br><br><br>ae(v)<br><br><br><br><br><br>ae(v)<br><br>ae(v)<br><br>ae(v)<br><br>ae(v) |

ANNEX 2

| | Descriptor |
|---|---|
| ⁠⁠⁠⁠⁠⁠⁠if( sao_offset_abs[ cIdx ][ rx ][ ry ][ i ] != 0 ) | |
| ⁠⁠⁠⁠⁠⁠⁠⁠sao_offset_sign[ cIdx ][ rx ][ ry ][ i ] | ae(v) |
| ⁠⁠⁠⁠⁠⁠sao_band_position[ cIdx ][ rx ][ ry ] | ae(v) |
| ⁠⁠⁠⁠⁠} else { | |
| ⁠⁠⁠⁠⁠⁠if( cIdx == 0 ) | |
| ⁠⁠⁠⁠⁠⁠⁠sao_eo_class_luma | ae(v) |
| ⁠⁠⁠⁠⁠⁠if( cIdx == 1 ) | |
| ⁠⁠⁠⁠⁠⁠⁠sao_eo_class_chroma | ae(v) |
| ⁠⁠⁠⁠⁠} | |
| ⁠⁠⁠⁠} | |
| ⁠⁠⁠} | |
| ⁠⁠} | |
| } | |

ANNEX 3

| | Descriptor |
|---|---|
| seq_parameter_set_rbsp( ) { | |
| ⁠⁠sps_video_parameter_set_id | u(4) |
| ⁠⁠sps_max_sub_layers_minus1 | u(3) |
| ⁠⁠sps_temporal_id_nesting_flag | u(1) |
| ⁠⁠profile_tier_level( sps_max_sub_layers_minus1 ) | |
| ⁠⁠sps_seq_parameter_set_id | ue(v) |
| ⁠⁠chroma_format_idc | ue(v) |
| ⁠⁠if( chroma_format_idc == 3 ) | |
| ⁠⁠⁠⁠separate_colour_plane_flag | u(1) |
| ⁠⁠pic_width_in_luma_samples | ue(v) |
| ⁠⁠pic_height_in_luma_samples | ue(v) |
| ⁠⁠conformance_window_flag | u(1) |
| ⁠⁠if( conformance_window_flag ) { | |
| ⁠⁠⁠conf_win_left_offset | ue(v) |
| ⁠⁠⁠conf_win_right_offset | ue(v) |
| ⁠⁠⁠conf_win_top_offset | ue(v) |
| ⁠⁠⁠conf_win_bottom_offset | ue(v) |
| ⁠⁠} | |
| ⁠⁠bit_depth_luma_minus8 | ue(v) |
| ⁠⁠bit_depth_chroma_minus8 | ue(v) |
| ⁠⁠log2_max_pic_order_cnt_lsb_minus4 | ue(v) |
| ⁠⁠sps_sub_layer_ordering_info_present_flag | u(1) |
| ⁠⁠for( i = ( sps_sub_layer ordering_info_present_flag ? 0: sps_max_sub_layers_minus1 ); | |
| ⁠⁠⁠⁠i <= sps max sub layers minus1; i++ ) { | |
| ⁠⁠⁠sps_max_dec_pic_buffering_minus1[ i ] | ue(v) |
| ⁠⁠⁠sps_max_num_reorder_pics[ i ] | ue(v) |
| ⁠⁠⁠sps_max_latency_increase_plus1[ i ] | ue(v) |
| ⁠⁠} | |
| ⁠⁠log2_min_luma_coding_block_size_minus3 | ue(v) |
| ⁠⁠1og2_diff max_min_luma_coding_block_size | ue(v) |
| ⁠⁠1og2_min_transform_block_size_minus2 | ue(v) |
| ⁠⁠1og2_diff max_min_transform_block_size | ue(v) |
| ⁠⁠max_transform_hierarchy_depth_inter | ue(v) |
| ⁠⁠max_transform_hierarchy_depth_intra | ue(v) |
| ⁠⁠scaling_list_enabled_flag | u(1) |
| ⁠⁠if( scaling_list_enabled_flag ) { | |
| ⁠⁠⁠sps_scaling_list_data_present_flag | u(1) |
| ⁠⁠⁠if( sps_scaling_list_data_present_flag ) | |
| ⁠⁠⁠⁠scaling_list_data( ) | |
| ⁠⁠} | |
| ⁠⁠amp_enabled_flag | u(1) |
| ⁠⁠sample_adaptive_offset_enabled_flag | u(1) |
| ⁠⁠if( sample_adaptive_offset_enabled_flag ) { | |
| ⁠⁠⁠sao_prefilter_present_flag | u(1) |
| ⁠⁠} | |
| ⁠⁠pcm_enabled_flag | u(1) |
| ⁠⁠if( pcm_enabled_flag ) { | |
| ⁠⁠⁠pcm_sample_bit_depth_luma_minus1 | u(4) |
| ⁠⁠⁠pcm_sample_bit_depth_chroma_minus1 | u(4) |
| ⁠⁠⁠1og2_min_pcm_luma_coding_block_size_minus3 | ue(v) |
| ⁠⁠⁠1og2_diff_max_min_pcm_luma_coding_block_size | ue(v) |
| ⁠⁠⁠pcm_loop_filter disabled_flag | u(1) |
| ⁠⁠} | |

ANNEX 3

| | Descriptor |
|---|---|
| num_short_term_ref_pic_sets | ue(v) |
| for( i = 0; i < num_short_term_ref_pic_sets; i++) | |
|    short_term_ref_pic_set( i ) | |
| long_term_ref_pics_present_flag | u(1) |
| if( long_term_ref_pics_present_flag ) { | |
|   num_long_term_ref_pics_sps | ue(v) |
|   for( i = 0; i < num_long_term_ref_pics_sps; i++ ) { | |
|     lt_ref_pic_poc_lsb_sps[ i ] | u(v) |
|     used_by_curr_pic_lt_sps_flag[ i ] | u(1) |
|   } | |
| } | |
| sps_temporal_mvp_enabled_flag | u(1) |
| strong_intra_smoothing_enabled_flag | u(1) |
| vui_parameters_present_flag | u(1) |
| if( vui_parameters_present_flag ) | |
|   vui_parameters( ) | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

ANNEX 4

| | Descriptor |
|---|---|
| sao( rx, ry ){ | |
|   if( rx > 0 ) { | |
|     leftCtbInSliceSeg = CtbAddrInRs > SliceAddrRs | |
|     leftCtbInTile = TileId[ CtbAddrInTs ] = = TileId[ CtbAddrRsToTs[ CtbAddrInRs − 1 ] ] | |
|     if( leftCtbInSliceSeg && leftCtbInTile ) | |
|       sao_merge_left_flag | ae(v) |
|   } | |
|   if( ry > 0 && !sao_merge_left_flag ) { | |
|     upCtbInSliceSeg = ( CtbAddrInRs − PicWidthInCtbsY ) >= SliceAddrRs | |
|     upCtbInTile = TileId[ CtbAddrInTs ] = = | |
|         TileId[ CtbAddrRsToTs[ CtbAddrInRs − PicWidthInCtbsY ] ] | |
|     if( upCtbInSliceSeg && upCtbInTile ) | |
|       sao_merge_up_flag | ae(v) |
|   } | |
|   if( !sao_merge_up_flag && !sao_merge_left_flag ) { | |
|     for( cIdx = 0; cIdx < 3; cIdx++ ) | |
|       if( ( slice_sao_luma_flag && cIdx = = 0 ) \|\| | |
|         ( slice_sao_chroma_flag && cIdx > 0 ) ) { | |
|         if( cIdx = = 0 ) | |
|           sao_type_idx_luma | ae(v) |
|         else if( cIdx = = 1 ) | |
|           sao_type_idx_chroma | ae(v) |
|         if( SaoTypeIdx[ cIdx ][ rx ][ ry ] != 0 ) { | |
|           for( i = 0; i < 4; i++ ) | |
|             sao_offset_abs[ cIdx ][ rx ][ ry ][ i ] | ae(v) |
|           if( SaoTypeIdx[ cIdx ][ rx ][ ry ] = = 1 ) { | |
|             if (sao_prefilter_present_flag ) { | |
|               sao_prefilter_flag | ae(v) |
|             } | |
|             for( i = 0; i < 4; i++ ) | |
|               if( sao_offset_abs[ cIdx ][ rx ][ ry ][ i ] != 0 ) | |
|                 sao_offset_sign[ cIdx ][ rx ][ ry ][ i ] | ae(v) |
|             sao_band_position[ cIdx ][ rx ][ ry ] | ae(v) |
|           } else { | |
|             if( cIdx = = 0 ) | |
|               sao_eo_class_luma | ae(v) |
|             if( cIdx = = 1 ) | |
|               sao_eo_class_chroma | ae(v) |
|           } | |
|         } | |
|       } | |
|   } | |
| } | |

The invention claimed is:

1. A method for encoding at least one image unit, comprising:
   encoding said at least one image unit,
   reconstructing said at least one image unit into at least one reconstructed image unit,
   applying a sample adaptive offset filter to said at least one reconstructed image unit;
   wherein applying a sample adaptive offset filter to said at least one reconstructed image unit comprises:
   determining at least one current category in a set of categories for at least one pixel of the reconstructed image unit,
   encoding an offset value for at least one category of said set of categories;
   determining that said current category is equal to said category having an encoded offset value, and
   in response thereto applying a pre-filter to the at least one pixel of the reconstructed image unit assigned to said category,
   wherein, for a pixel of the reconstructed image unit to be pre-filtered, said pre-filter is a median filter taking into account all of the pixels of a filtering window inside the reconstructed image unit assigned to a category having an associated encoded offset value;
   adding said encoded offset value to said at least one pixel of the reconstructed image unit.

2. The method of claim 1, further comprising encoding a pre-filtering indicator for at least said reconstructed image unit and wherein said pre-filter is applied to the at least one pixel of the reconstructed image unit assigned to said category only in the case where said current category is equal to said category having a encoded offset value and said pre-filtering indicator indicates said reconstructed image unit should be pre-filtered.

3. The method of claim 1, wherein said pre-filter is applied to the at least one pixel of the reconstructed image unit assigned to said category only in the case where said current category is equal to said category having an encoded offset value and said encoded offset value is not equal to zero.

4. A method for decoding a stream representative of at least one image unit, comprising:
   decoding said stream to obtain at least one reconstructed image unit,
   applying a sample adaptive offset filter to said at least one reconstructed image unit;
   wherein applying a sample adaptive offset filter to said at least one reconstructed image unit comprises:
   determining at least one current category in a set of categories for at least one pixel of the reconstructed image unit,
   decoding an offset value for at least one category of said set of categories;
   determining said current category is equal to said category having said decoded offset value, and
   in response thereto applying a pre-filter to the at least one pixel of the reconstructed image unit assigned to said category,
   wherein, for a pixel of the reconstructed image unit to be pre-filtered, said pre-filter is a median filter taking into account all of the pixels of a filtering window inside the reconstructed image unit assigned to a category having an associated decoded offset value;
   adding said decoded offset value to said at least one pixel of the reconstructed image unit.

5. The method of claim 4, further comprising decoding a pre-filtering indicator for at least said reconstructed image unit and wherein said pre-filter is applied to the at least one pixel of the reconstructed image unit assigned to said category only in the case where said current category is equal to said category having a decoded offset value and said pre-filtering indicator indicates said reconstructed image unit should be pre-filtered.

6. The method according to claim 4, wherein said pre-filter is applied to the at least one pixel of the reconstructed image unit assigned to said category only in the case where said current category is equal to said category having a decoded offset value and said decoded offset value is not equal to zero.

7. A device for encoding at least one image unit, comprising at least one processor configured to:
   encode said at least one image unit, reconstruct said at least one image unit into at least one reconstructed image unit,
   apply a sample adaptive offset filter to said at least one reconstructed image unit;
   wherein said at least one processor configured to apply a sample adaptive offset filter to said at least one reconstructed image unit is also configured to:
   determine at least one current category in a set of categories for at least one pixel of the reconstructed image unit, encode an offset value for at least one category of said set of categories;
   determine that said current category is equal to said category having an encoded offset value, and
   in response thereto apply a pre-filter to the at least one pixel of the reconstructed image unit assigned to said category,
   wherein, for a pixel of the reconstructed image unit to be pre-filtered, said pre-filter is a median filter taking into account all of the pixels of a filtering window inside the reconstructed image unit assigned to a category having an associated encoded offset value;
   add said encoded offset value to said at least one pixel of the reconstructed image unit.

8. The device of claim 7, wherein the at least one processor is further configured to encode a pre-filtering indicator for at least said reconstructed image unit and wherein said pre-filter is applied to the at least one pixel of the reconstructed image unit assigned to said category only in the case where said current category is equal to said category having a encoded offset value and said pre-filtering indicator indicates said reconstructed image unit should be pre-filtered.

9. The device of claim 7, wherein said pre-filter is applied to the at least one pixel of the reconstructed image unit assigned to said category only in the case where said current category is equal to said category having an encoded offset value and said encoded offset value is not equal to zero.

10. A device for decoding a stream representative of at least one image unit, comprising at least one processor configured to:
    decode said stream to obtain at least one reconstructed image unit,
    apply a sample adaptive offset filter to said at least one reconstructed image unit;
    wherein said at least one processor configured to apply a sample adaptive offset filter to said at least one reconstructed image unit is also configured to:

determine at least one current category in a set of categories for at least one pixel of the reconstructed image unit, decode an offset value for at least one category of said set of categories;

determine that said current category is equal to said category having a decoded offset value, and in response thereto apply a pre-filter to the at least one pixel of the reconstructed image unit assigned to said category, wherein, for a pixel of the reconstructed image unit to be pre-filtered, said pre-filter is a median filter taking into account all of the pixels of a filtering window inside the reconstructed image unit assigned to a category having an associated decoded offset value;

add said decoded offset value to said at least one pixel of the reconstructed image unit.

11. The device of claim 10, wherein said at least one processor is further configured to decode a pre-filtering indicator for at least said reconstructed image unit and wherein said pre-filter is applied to the at least one pixel of the reconstructed image unit assigned to said category only in the case where said current category is equal to said category having a decoded offset value and said pre-filtering indicator indicates said reconstructed image unit should be pre-filtered.

12. The device according to claim 10, wherein said pre-filter is applied to the at least one pixel of the reconstructed image unit assigned to said category only in the case where said current category is equal to said category having a decoded offset value and said decoded offset value is not equal to zero.

* * * * *